US009375984B2

(12) United States Patent
Bonacini

(10) Patent No.: US 9,375,984 B2
(45) Date of Patent: Jun. 28, 2016

(54) MACHINE FOR FITTING AND REMOVING WHEEL TYRES FOR VEHICLES

(71) Applicant: GIULIANO GROUP S.p.A., Correggio (RE) (IT)

(72) Inventor: Maurizio Bonacini, Correggio (IT)

(73) Assignee: GIULIANO GROUP S.P.A., Corregio (RE) (IT)

( * ) Notice: Subject to any disclaimer, the term of this patent is extended or adjusted under 35 U.S.C. 154(b) by 247 days.

(21) Appl. No.: 14/157,834

(22) Filed: Jan. 17, 2014

(65) Prior Publication Data

US 2014/0196856 A1    Jul. 17, 2014

(30) Foreign Application Priority Data

Jan. 17, 2013  (IT) .............................. MO2013A0008

(51) Int. Cl.
*B60C 25/138*    (2006.01)
(52) U.S. Cl.
CPC .................................... *B60C 25/138* (2013.01)
(58) Field of Classification Search
CPC ............ B60C 25/0515; B60C 25/0545; B60C 25/0551; B60C 25/0563; B60C 25/0572; B60C 25/059; B60C 25/0593; B60C 25/138
See application file for complete search history.

(56) References Cited

U.S. PATENT DOCUMENTS

| | | | |
|---|---|---|---|
| 5,226,465 A | 7/1993 | Schon et al. | |
| 6,182,735 B1 | 2/2001 | du Quesne | |
| 6,182,736 B1* | 2/2001 | Cunningham | ........ B60C 25/135 157/1.17 |
| 6,422,285 B1* | 7/2002 | Gonzaga | ............... B60C 25/132 157/1.24 |
| 6,880,606 B2* | 4/2005 | Gonzaga | ............... B60C 25/125 157/1.24 |
| 6,886,619 B2* | 5/2005 | Gonzaga | ............... B60C 25/138 157/1.2 |
| 6,935,397 B2* | 8/2005 | Gonzaga | ............. B60C 25/0518 157/1.17 |
| 7,543,622 B1 | 6/2009 | Carpenter et al. | |
| 8,196,637 B1* | 6/2012 | Story | .................. B60C 25/0545 157/1.1 |
| 8,381,791 B2* | 2/2013 | Corghi | .................. B60C 25/138 157/1.17 |
| 8,387,675 B1* | 3/2013 | Vaninger | ............... B60C 25/138 157/1.17 |
| 8,528,620 B2* | 9/2013 | Cai | ....................... B60C 25/138 157/1.17 |
| 8,613,303 B1* | 12/2013 | Hanneken | ............. B60C 25/138 157/1.17 |
| 8,770,254 B1* | 7/2014 | Hanneken | ............. B60C 25/138 157/1.17 |
| 8,783,326 B1* | 7/2014 | Vaninger | ............. B60C 25/0551 157/1.17 |

(Continued)

FOREIGN PATENT DOCUMENTS

EP    0 909 667 A1    4/1999

OTHER PUBLICATIONS

IT Search Report, Oct. 15, 2013, from corresponding IT application.

*Primary Examiner* — David B Thomas
(74) *Attorney, Agent, or Firm* — Young & Thompson

(57) ABSTRACT

The machine (1) for fitting and removing wheel tyres for vehicles includes: a bearing structure (2); a locking device (5) of a rim (C) of a wheel (R) for vehicles, associated with the bearing structure (2) and rotatable around a first rotation axis (X1); a tool carrier arm (10) associated mobile with the bearing structure and having at least a tool (11) for removing/fitting a tyre (P) from/on the rim (C); an auxiliary arm (12) associated mobile with the bearing structure and having a bead-pressing tool (13) suitable for facilitating the removal/fitting operations of the tyre (P) from/on the rim (C); wherein the auxiliary arm is associated rotatable with the bearing structure around a second rotation axis (X2) substantially parallel to the first rotation axis (X1), in correspondence to a hinging point (14) arranged below with respect to a resting surface of the rim defined by the locking device.

11 Claims, 7 Drawing Sheets

(56) References Cited

U.S. PATENT DOCUMENTS

| | | | |
|---|---|---|---|
| 2008/0060768 A1* | 3/2008 | Vignoli | B60C 25/138 157/1.24 |
| 2009/0236046 A1* | 9/2009 | Mimura | B60C 25/138 157/1.1 |
| 2009/0236048 A1* | 9/2009 | Mimura | B60C 25/138 157/1.24 |
| 2011/0079362 A1* | 4/2011 | Xilin | B60C 25/138 157/1.17 |
| 2012/0097340 A1* | 4/2012 | Sotgiu | B60C 25/0551 157/1.24 |

* cited by examiner

MACHINE FOR FITTING AND REMOVING WHEEL TYRES FOR VEHICLES

FIELD OF THE INVENTION

The present invention relates to a machine for fitting and removing wheel tyres for vehicles.

BACKGROUND OF THE INVENTION

The use is known of so-called "tyre-changing" machines which permit fitting and removing the tyre to/from the relative rim of a vehicle wheel. Such tyre-changing machines are used, e.g., in garages to perform maintenance or replacement jobs on the rim and/or the tyre itself Generally, known tyre-changing machines comprise a frame for supporting means for gripping and rotating the rim of a wheel, and for supporting a tool carrier arm having at least a tool suitable for removing and/or fitting the tyre from/to the rim.

The supporting frame generally comprises a base for supporting the rim gripping and rotating means, commonly made up of a specific self-centring spindle positioned at a preset height off the ground.

The supporting frame also comprises a vertical upright which extends from the rear portion of the base and which supports a specific tool carrier arm which is adjustable along a horizontal direction depending on the specific dimensions of the wheel to be worked.

The tool carrier arm has a vertically adjustable removal/fitting tool.

The use is also known of at least an auxiliary arm having a specific bead-pressing tool usable to make the rim fitting/removal operations easier, in particular for low profile and "runflat" tyres.

For example, a first type of auxiliary arm comprises a horizontal arm hinged to the vertical upright of the supporting frame and which can be turned like a weathervane, with which the bead-pressing tool is associated vertically movable.

A second type of auxiliary arm comprises an articulated arm, hinged to the vertical upright of the supporting frame and suitable for supporting the bead-pressing tool movably and vertically.

A further possible solution also envisages the use of a supplementary supporting upright, generally fastened to the supporting frame alongside the main upright, suitable for supporting the auxiliary arm and the relative bead-pressing tool.

During the removal phase, an operator positions and locks the rim of the wheel to be worked on the spindle and, by means of a specific bead-breaking tool, performs a preliminary operation involving the detachment of the tyre bead from the annular flanges of the rim.

Subsequently, the operator adjusts the position of the removal/fitting tool according to the specific dimensions of the wheel, positioning it in correspondence to a section of the tyre to be raised above the edge of the rim, and moves the tool so as to extract a portion of the bead above the rim.

The auxiliary arm is turned until the bead-pressing tool is positioned in correspondence to a portion of the tyre substantially opposite the tyre raised portion by means of the removal/fitting tool.

In particular, the pressure applied by means of the bead-pressing tool favours the extraction of the tyre bead.

Subsequently, the wheel is partially rotated to allow the bead to be extracted and, during such rotation, the bead-pressing tool continues to apply a pressure on the tyre, following the rotation of the wheel.

When the bead-pressing tool is in the proximity of the removal/fitting tool, then the operator lifts the bead-pressing tool by operating the specific control lever and positions the auxiliary arm in an idle position so as not to hinder the movements of the operator during the removal of the tyre from the rim.

The complete rotation of the wheel then permits completing the extraction of the wheel bead above the edge of the rim.

In the same way, during fitting, an operator positions and locks the rim of the wheel to be worked on the spindle and suitably positions the tyre to be fitted on the rim.

Subsequently, the operator adjusts the position of the removal/fitting tool according to the specific dimensions of the wheel, positioning it in correspondence to a section of the tyre and pressing it below the edge of the rim.

The auxiliary arm is rotated until the bead-pressing tool is positioned in correspondence to a portion of the tyre, in the proximity of the removal/fitting tool.

In particular, the pressure applied by the bead-pressing tool favours the insertion of the tyre bead.

Subsequently, the wheel is partially rotated to allow inserting the bead and, during such rotation, the bead-pressing tool continues to apply a pressure on the tyre, following the rotation of the wheel.

When the bead-pressing tool is in the proximity of the removal/fitting tool, then the operator lifts the bead-pressing tool by operating the specific control lever and positions the auxiliary arm in an idle position so as not to hinder the movements of the operator during the removal of the tyre from the rim.

The complete rotation of the wheel then permits completing the insertion of the wheel bead below the edge of the rim.

The known solutions described above do however have a number of drawbacks.

In particular, the presence of the auxiliary arm, especially if supported by a specific supplementary upright, considerably increases the overall dimensions of the tyre-changing machine.

In particular, once drawn up in an idle position, with the bead-pressing tool moved away from the rim gripping and rotating means, the supplementary arm has greater overall dimensions in correspondence to the rear portion of the tyre-changing machine.

Furthermore, after being used for tyre removal/fitting operations, the auxiliary arm must necessarily be repositioned in idle position, with the bead-pressing tool spaced apart from the rim gripping and rotating means, so as not to hinder the movements of the operator during the removal or positioning of the tyre from/on the rim.

Consequently, such operation inevitably involves an increase in the time needed to complete the tyre removal/fitting operations.

SUMMARY OF THE INVENTION

The main aim of the present invention is to provide a machine for fitting and removing wheel tyres for vehicles which permits considerably reducing the overall dimensions of the machine itself.

Another object of the present invention is to provide a machine for fitting and removing wheel tyres for vehicles which permits simplifying and speeding up the tyre fitting/removal operations.

Another object of the present invention is to provide a machine for fitting and removing wheel tyres for vehicles which allows overcoming the mentioned drawbacks of the state of the art within the ambit of a simple, rational, easy, effective to use and low cost solution.

The above objects are achieved by the present machine for fitting and removing wheel tyres for vehicles, comprising:
at least a bearing structure;
at least a locking device of a rim of a wheel for vehicles, associated with said bearing structure and rotatable around a first rotation axis;
at least a tool carrier arm associated mobile with said bearing structure and having at least a tool for removing/fitting a tyre from/on said rim;
at least an auxiliary arm associated mobile with said bearing structure and having at least a bead-pressing tool suitable for facilitating the removal/fitting operations of the tyre from/on the rim;
characterized by the fact that said auxiliary arm is associated rotatable with said bearing structure around a second rotation axis substantially parallel to said first rotation axis, in correspondence to at least a hinging point arranged below with respect to a resting surface of said rim defined by said locking means.

BRIEF DESCRIPTION OF THE DRAWINGS

Other characteristics and advantages of the present invention will become more evident from the description of a preferred, but not sole, embodiment of a machine for fitting and removing wheel tyres for vehicles, illustrated purely as an example but not limited to the annexed drawings in which.

DETAILED DESCRIPTION OF THE INVENTION

Figure 1:
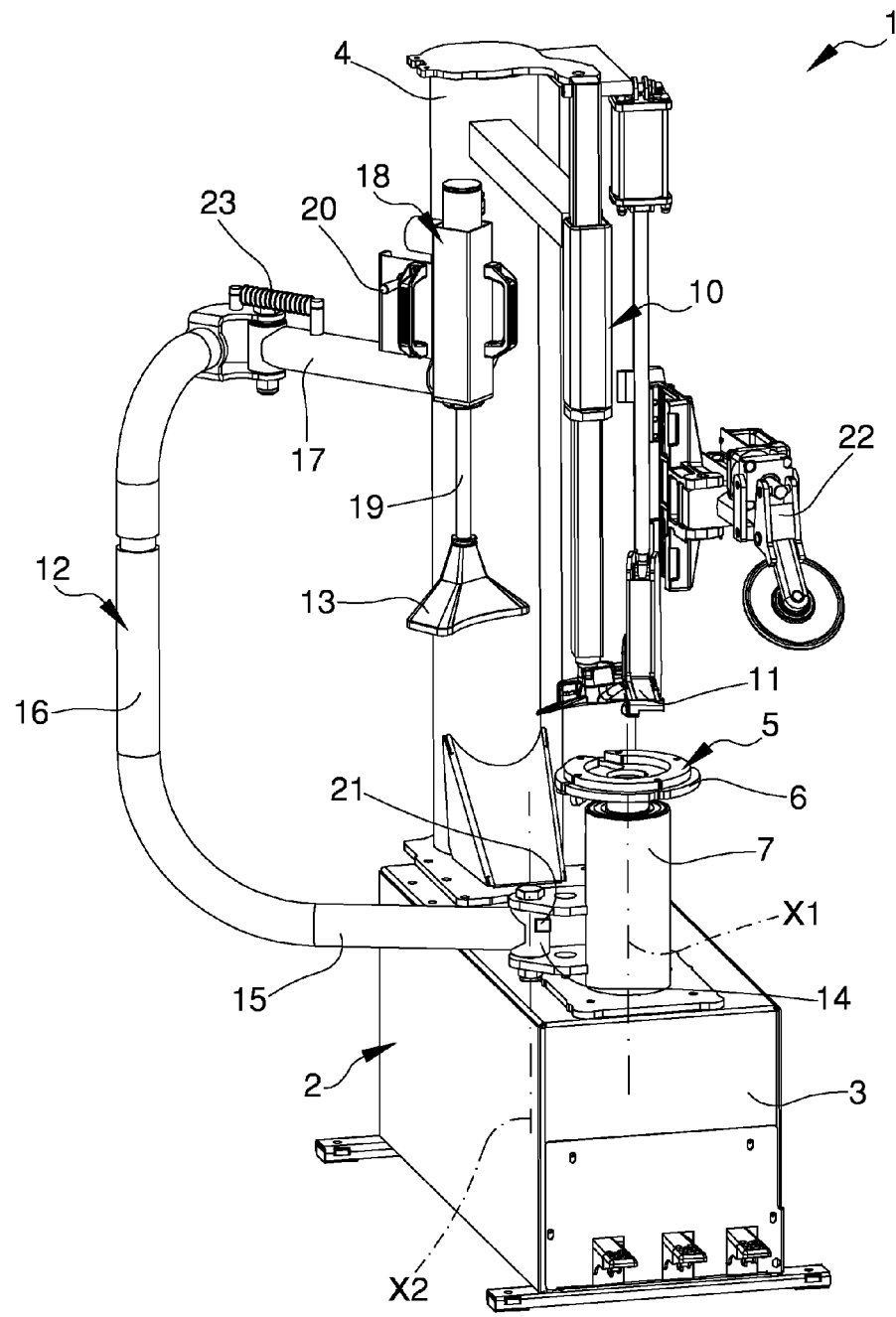
FIG. 1 is an axonometric view of the machine according to the invention.

With particular reference to such figures, globally indicated by 1 is a machine for fitting and removing wheel tyres for vehicles of the type usable, e.g., in garages to perform maintenance or replacement jobs on the rim and/or the tyre itself.

In particular, the machine 1 comprises a bearing structure 2.

With reference to the particular embodiment shown in the illustrations, the bearing structure 2 comprises a resting base 3 and an upright 4 which extends vertically from the base itself in correspondence to a substantially rear portion of the machine 1.

A bearing structure 2 of different conformation and/or dimension cannot however be ruled out.

The machine 1 also comprises a locking device 5 suitable for locking the rim C of a wheel R for vehicles.

In particular, the locking device 5 is supported by the base 3 and is rotatable by action of suitable motor means around a first substantially vertical rotation axis X1.

With reference to the particular embodiment of the machine 1 shown in the illustrations, the locking device 5 is made up of a conventional spindle with cone lock comprising a plate 6 for resting the rim C of the wheel R, that is fitted rotatable on a specific supporting cylinder 7 which extends vertically from the base 3.

The resting plate 6 has a central hole inside which can be inserted a pin 8, to which a locking cone 9 is axially coupled rotatable, if necessary having suitable grip knobs, suitable for engaging on the rim C in correspondence to the through hole for locking the rim itself on the plate 6.

Other embodiments of the locking device 5 cannot however be ruled out which can consist, e.g., of a conventional spindle with claw locking.

The machine 1 also comprises a tool carrier arm 10, associated mobile with the upright 4 of the bearing structure 2 and having at least a tool 11 for removing/fitting a tyre P from/on the rim C.

In particular, the tool carrier arm 10 can be moved to remove and/or fit tyres P of wheels R with a radius between a predefined maximum radius $R_{MAX}$ and a predefined minimum radius $R_{min}$.

In practice, the maximum radius $R_{MAX}$ indicates the radius of the wheel of maximum dimensions that can be worked by means of the machine 1, while the minimum radius $R_{min}$ indicates the radius of the wheel of minimum dimensions that can be worked by means of the machine 1.

The machine 1 also comprises an auxiliary arm 12 associated mobile with the bearing structure 2 and having at least a bead-pressing tool 13 suitable for facilitating the removal/fitting operations of the tyre P from/on the rim C.

Advantageously, the auxiliary arm 12 is rotatable around a second rotation axis X2 substantially parallel to the first rotation axis X1, where the distance of the second rotation axis X2 from the first rotation axis X1 is defined by the following formula:

$$0 \leq d(X1,X2) \leq R_{MAX}$$

where d (X1, X2) indicates said distance of the second rotation axis X2 from the first rotation axis X1 and $R_{MAX}$ indicates the predefined maximum radius of the wheel R.

In particular, with reference to a preferred embodiment of the machine 1, the distance of the second rotation axis X2 from the first rotation axis X1 is defined by the following formula:

$$0 \leq d(X1,X2) \leq R_{min}$$

where d(X1, X2) indicates the distance of the second rotation axis X2 from the first rotation axis X1 and $R_{min}$ indicates the predefined minimum radius of the wheel R.

The auxiliary arm 12 is associated rotatable with the bearing structure 2 in correspondence to at least a hinging point 14.

In particular, the hinging point 14 is arranged below the resting surface of the rim C defined by the resting plate 6.

In this respect, it is pointed out that by the word "below" is meant the positioning of the hinging point 14 between the locking device 5 and a portion of the bearing structure 2 which supports the locking device itself With reference to the particular embodiment of the machine 1 shown in the illustrations, the hinging point 14 is defined in correspondence to the supporting cylinder 7 of the plate 6.

Different positioning of the hinging point 14 cannot however be ruled out in different points of the base 3 or of the bearing structure 2 in general.

The auxiliary arm 12 comprises a substantially horizontal portion 15 having an extremity hinged in correspondence to the hinging point 14, arranged below the resting surface of plate 6 and rotatable around the second rotation axis X2.

The auxiliary arm 12 also comprises a substantially vertical portion 16 having a lower section connected to the horizontal portion 15, below the resting surface defined by the plate 6, and an upper section connected to the bead-pressing tool 13, above the resting surface defined by plate 6.

In particular, the auxiliary arm 12 comprises a substantially horizontal articulated portion 17 having the bead-pressing tool 13 and hinged to the upper section of the vertical portion 16.

The auxiliary arm 12 also comprises a movement arrangement 18 suitable for moving the bead-pressing tool 13 along a substantially vertical direction between a raised position and a lowered position.

In particular, the movement arrangement 18 comprise a linear actuator 19, of the type e.g. of a fluid operated linear actuator.

The movement arrangement 18 also comprise a control device 20, of the type of a lever or the like, suitable for controlling the movement of the bead-pressing tool 13 between the raised position and the lowered position.

Advantageously, the machine 1 comprises an automatic start device 21 of the movement arrangement 18, connected to the tool carrier arm 10 and suitable for being activated automatically in correspondence to a predetermined angular position of the auxiliary arm 12 to bring the bead-pressing tool 13 from the lowered position to the raised position.

In particular, the automatic start device 21 is preferably made up of a suitable micro switch arranged in correspondence to the hinging point 14 and operatively connected to the linear actuator 19.

Usefully, the auxiliary arm 12 comprises a suitable return spring 23, arranged between the articulated portion 17 and the upper portion of the vertical portion 16, suitable for returning the articulated portion 17 to a drawn up idle position.

The operation of machine 1 is described below.

Figure 2:
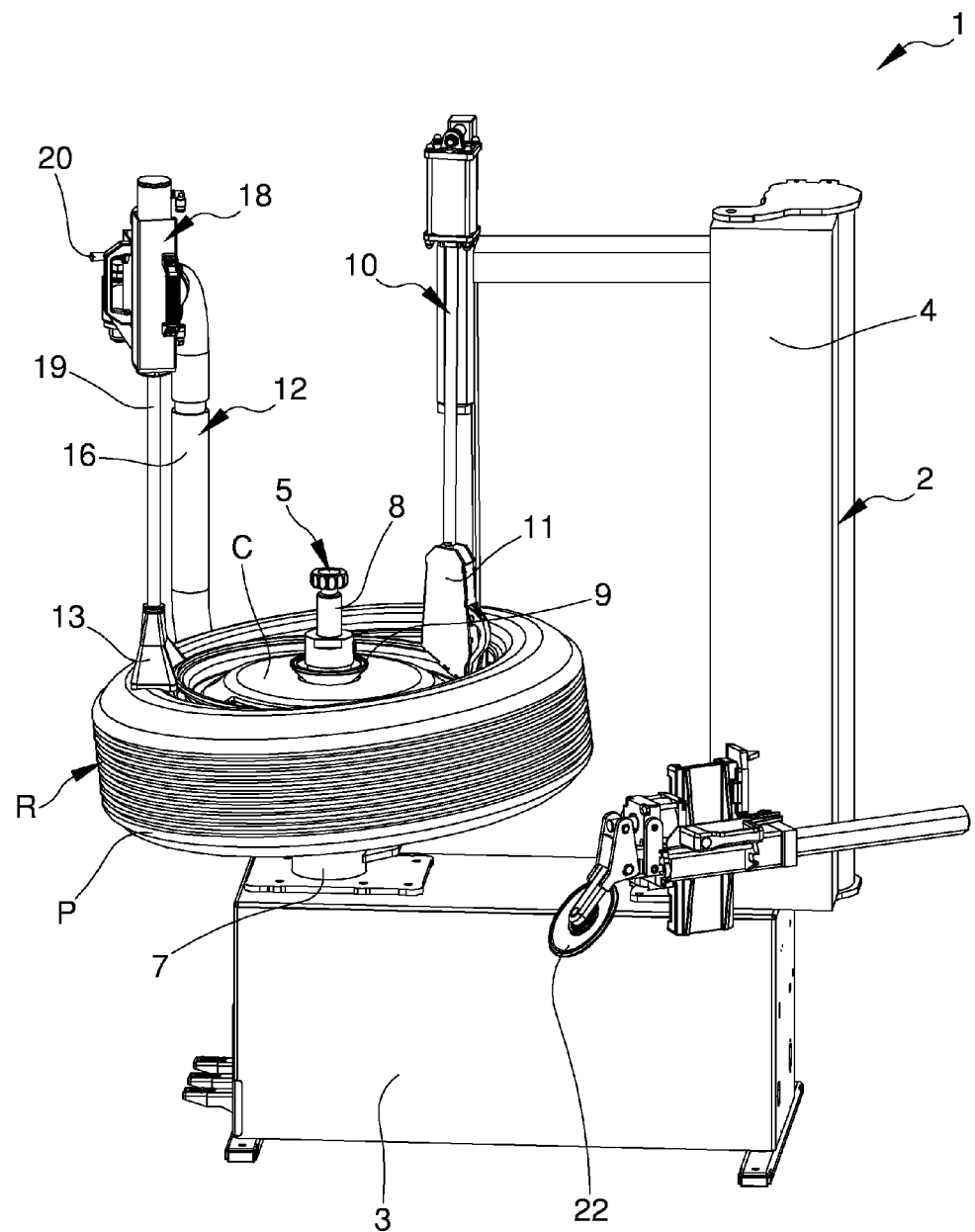
FIGS. 2 to 7 show the operation of the machine according to the invention.
Figure 3:
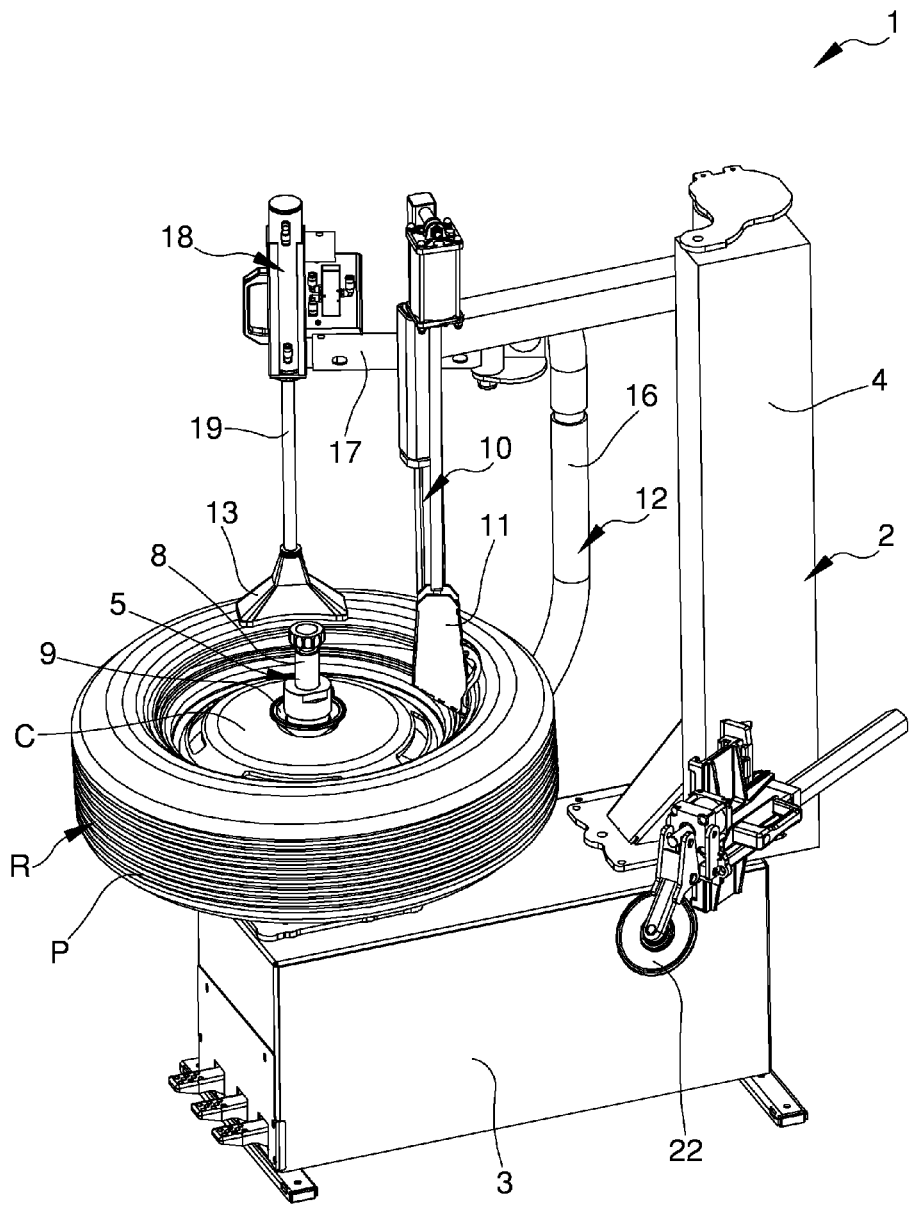
Figure 4:
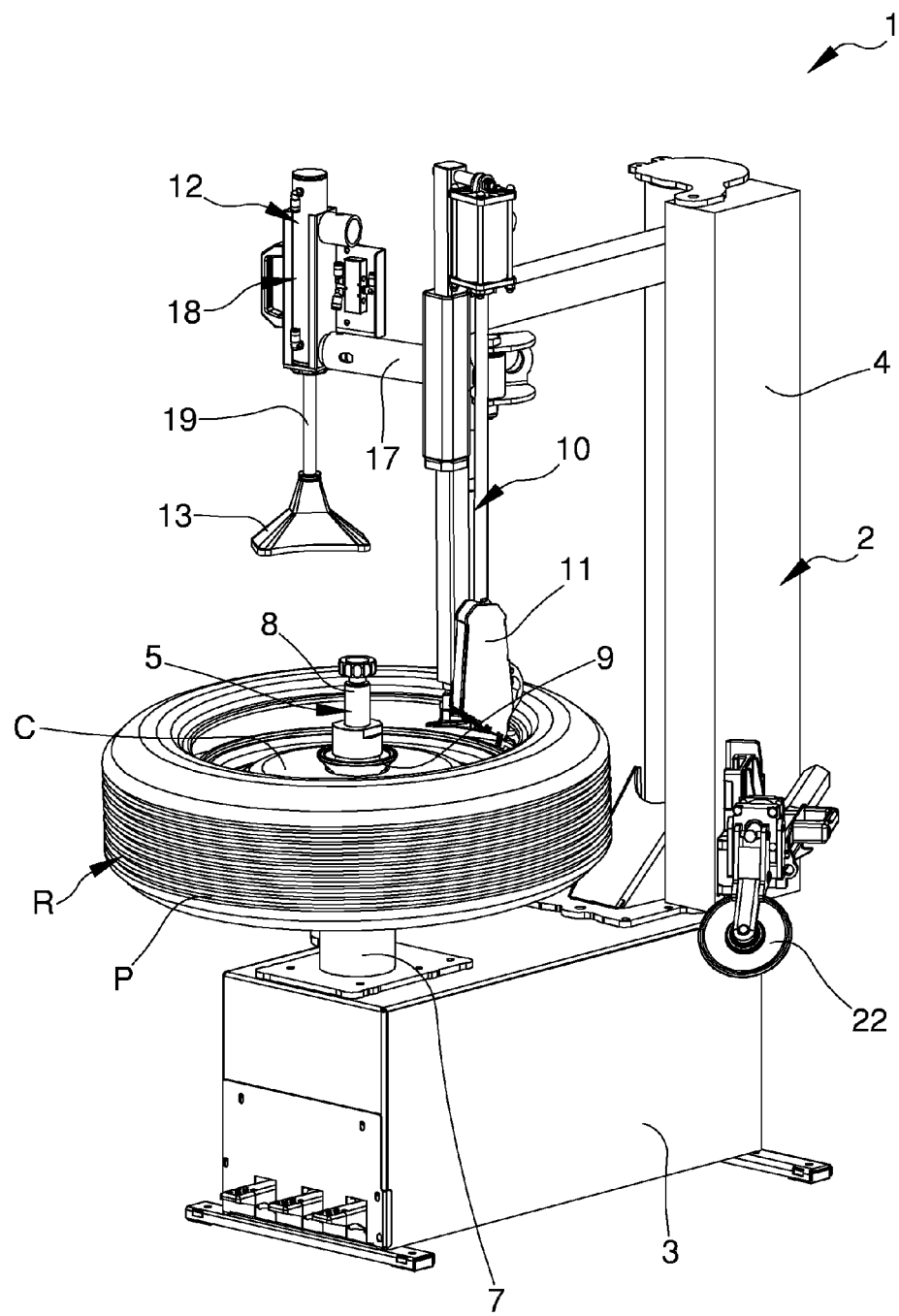

During removal, shown in the FIGS. 2, 3 and 4, an operator positions and locks the rim C of the wheel R to be worked on the plate 6 by means of the cone 9 and performs, by means of a specific bead-breaker tool 22, a preliminary phase of detachment of the bead of the tyre P from the annular flanges of the rim.

Subsequently, the operator adjusts the position of the removal/fitting tool 11 according to the specific dimensions of the wheel R, positioning it in correspondence to a section of the tyre P to be raised above the edge of the rim C, and moves the tool 11 so as to extract a portion of the bead above the rim C (FIG. 2).

The auxiliary arm 12 is rotated until the bead-pressing tool 13 is positioned in correspondence to a portion of the tyre P substantially opposite the portion of the tyre P raised by means of the removal/fitting tool 11 (FIG. 2).

In particular, the pressure applied by the bead-pressing tool 13 favours the extraction of the bead of the tyre P.

Subsequently, the wheel R is partially rotated to allow the extraction of the bead and, during such rotation, the bead-pressing tool 13 continues to apply a pressure on the tyre P, following the rotation of the wheel R.

When the bead-pressing tool is in the proximity of the removal/fitting tool, the linear actuator 19 is automatically operated by the micro switch 21 and, this way, the bead-pressing tool 13 is brought to a raised position, thus releasing the tyre P (FIGS. 3 and 4).

Consequently, the auxiliary arm 12 and the respective bead-pressing tool 13 are automatically brought to idle position, so as not to hinder the movements of the operator during the removal of the tyre P from the rim C, by means of the rotation of the wheel R only and without the operator having to intervene in any way.

The complete rotation of the wheel R then permits completing the extraction of the bead of the wheel R above the edge of the rim C.

Figure 5:
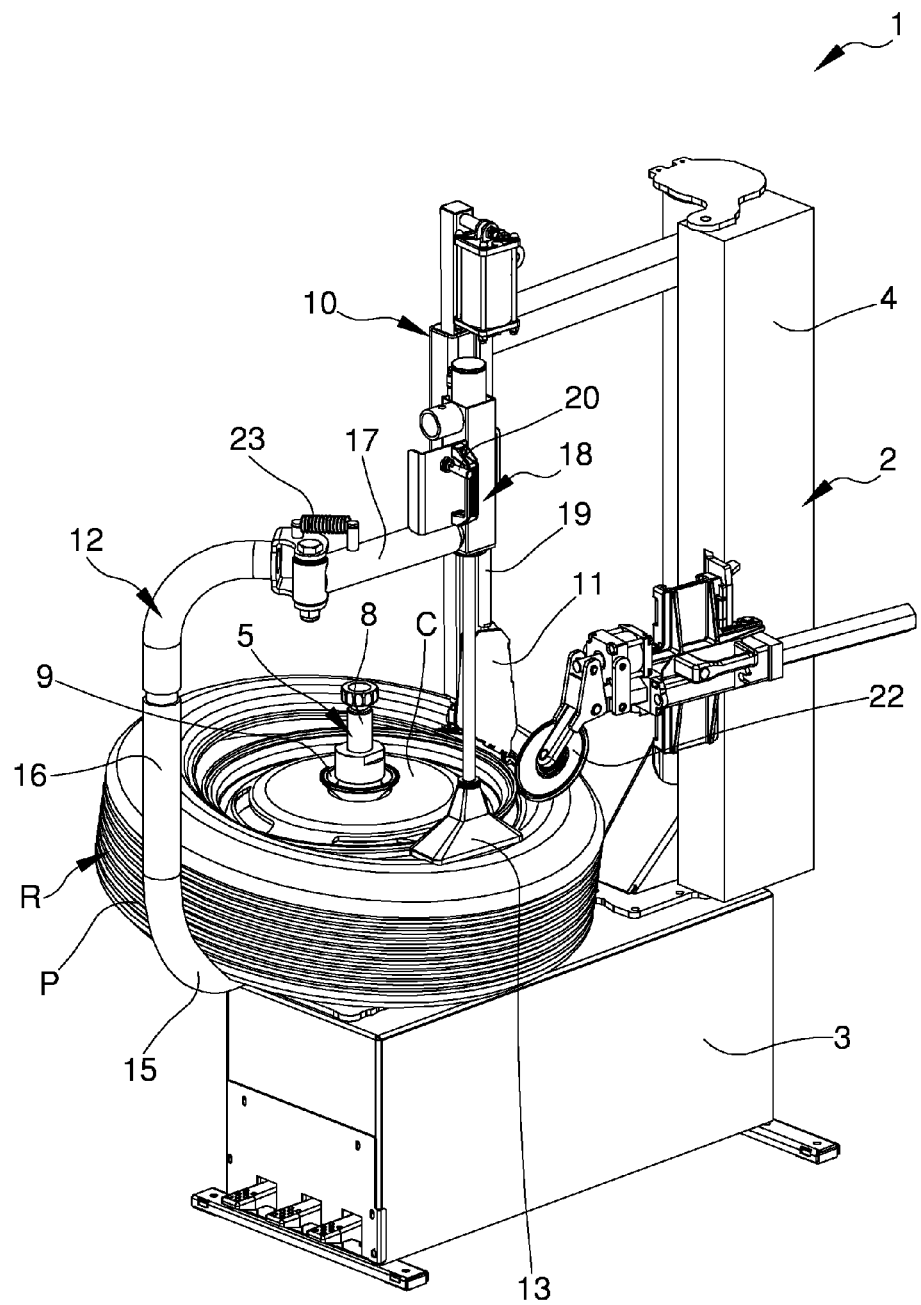
Figure 6:
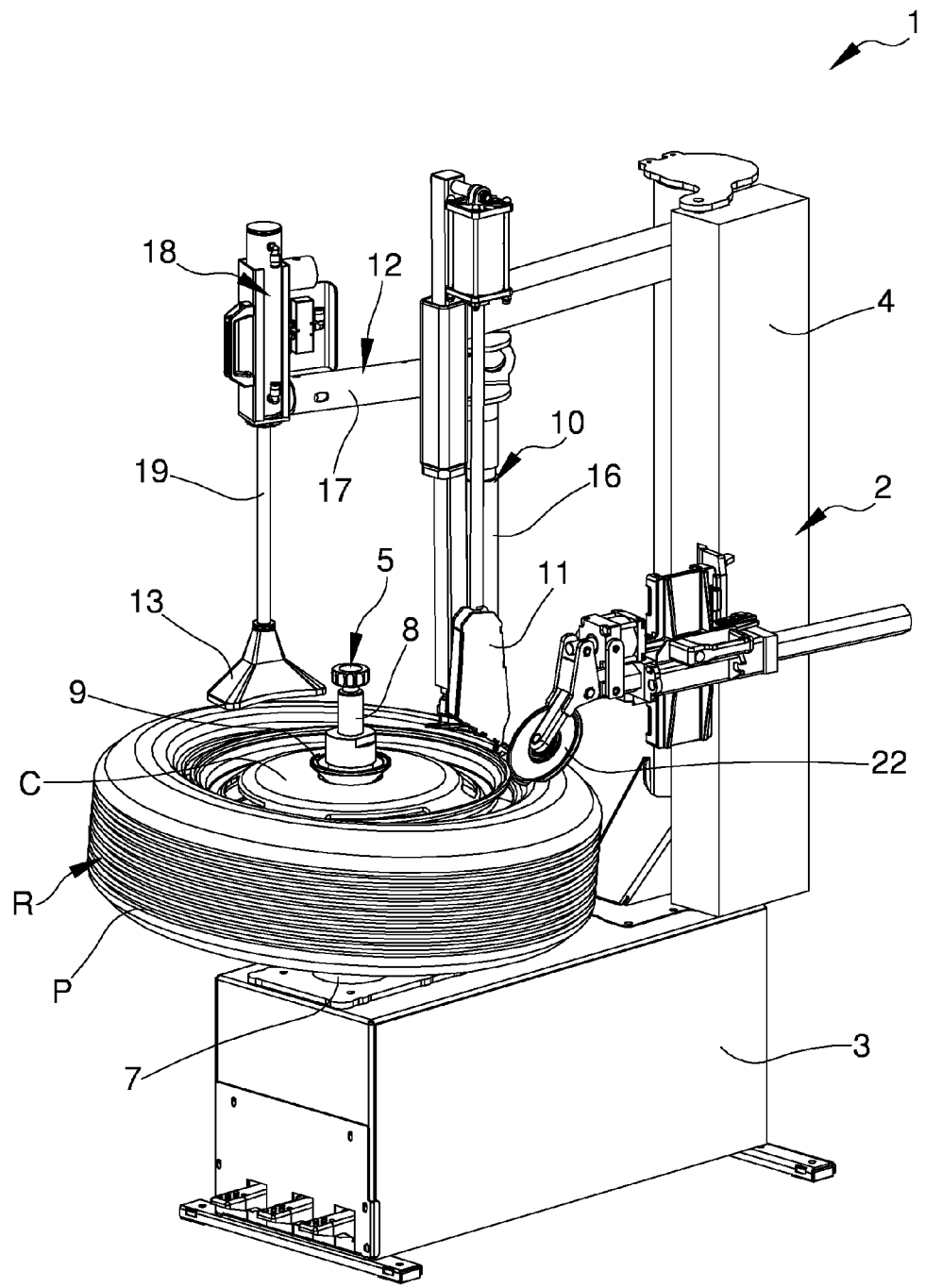
Figure 7:
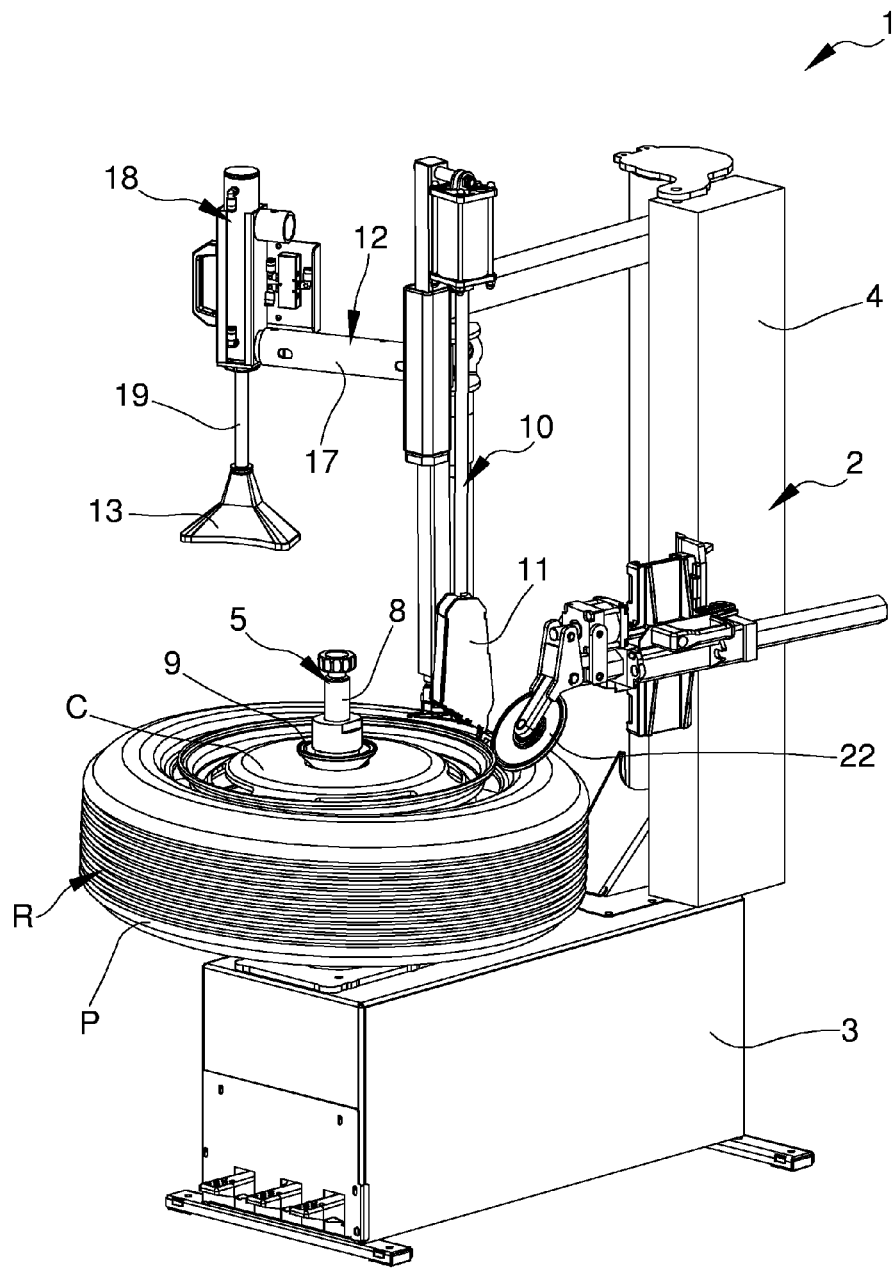

In the same way, during fitting, shown in the FIGS. 5, 6 and 7, an operator positions and locks in position the rim C of the wheel R to be worked on the plate 6 and suitably positions the tyre P to be fitted on the rim itself.

Subsequently, the operator adjusts the position of the removal/fitting tool 11 according to the specific dimensions of the wheel R, positioning it in correspondence to a section of the tyre P and pressing it below the edge of the rim C (FIG. 5).

The auxiliary arm 12 is rotated until the bead-pressing tool 13 is positioned in correspondence to a portion of the tyre P in the proximity of the removal/fitting tool 11 (FIG. 5).

In particular, the pressure applied by means of the bead-pressing tool 13 favours the insertion of the bead of the tyre P.

Subsequently, the wheel R is partially rotated to permit the insertion of the bead and, during such rotation, the bead-pressing tool 13 continues to apply a pressure on the tyre P, following the rotation of the wheel R.

When the bead-pressing tool 13 is in the proximity of the removal/fitting tool 11, the linear actuator 19 is automatically operated by the micro switch 21 and, this way, the bead-pressing tool 13 is brought to a raised position, releasing the tyre P (FIGS. 6 and 7).

Consequently, the auxiliary arm 12 and the respective bead-pressing tool 13 are automatically brought to the idle position, so as not to hinder the movements of the operator during the final wheel fitting and removal stages, by means of the rotation of the wheel R only and without the operator having to intervene in any way.

The complete rotation of the wheel R then permits completing the insertion of the bead of the wheel itself below the edge of the rim C.

It has in fact been ascertained how the described invention achieves the proposed objects.

In particular, the fact is underlined that the particular positioning of the hinging point of the auxiliary arm permits considerably reducing the overall dimensions of the machine itself, simplifying and speeding up the tyre fitting/removal operations at the same time.

The invention claimed is:

1. Machine (1) for fitting and removing wheel tyres for vehicles, comprising:
   at least a bearing structure (2);
   at least a locking device (5) of a rim (C) of a wheel (R) for vehicles, associated with said bearing structure (2) and rotatable around a first rotation axis (X1);
   at least a tool carrier arm (10) associated mobile with said bearing structure (2) and having at least a tool (11) for removing/fitting a tyre (P) from/on said rim (C);
   at least an auxiliary arm (12) associated mobile with said bearing structure (2) and having at least a bead-pressing tool (13) suitable for facilitating the removal/fitting operations of the tyre (P) from/on the rim (C);
   wherein said auxiliary arm (12) is associated rotatable with said bearing structure (2) around a second rotation axis (X2) substantially parallel to said first rotation axis (X1), in correspondence to at least a hinging point (14) arranged below with respect to a resting surface of said rim (C) defined by said locking device (5), and
   wherein said tool carrier arm (10) can be moved to remove/fit wheel tyres with a radius between a predefined maximum radius ($R_{MAX}$) and a predefined minimum radius ($R_{min}$), wherein the distance of said second rotation axis (X2) from said first rotation axis (X1) is defined by the following formula:

$$0 \leq d(X1, X2) \leq R_{MAX}$$

where d(X1, X2) indicates said distance of the second rotation axis (X2) from the first rotation axis (X1) and $R_{MAX}$ indicates said predefined maximum radius ($R_{MAX}$).

2. Machine (1) according to claim 1, wherein said auxiliary arm (12) comprises at least an articulated portion (17).

3. Machine (1) according to claim 1, wherein said auxiliary arm (12) comprises a movement arrangement (18) of said bead-pressing tool (13) along a substantially vertical direction between a raised position and a lowered position.

4. Machine (1) according to the claim 3, wherein said movement arrangement (18) comprise at least a linear actuator (19).

5. Machine (1) according to claim 3, comprising at least an automatic start device (21) of said movement arrangement (18) connected to said tool carrier arm (10) and suitable for being activated automatically in correspondence to a predetermined angular position of said auxiliary arm (12) to bring said bead-pressing tool (13) from said lowered position to said raised position.

6. Machine (1) for fitting and removing wheel tyres for vehicles, comprising:
   at least a bearing structure (2);
   at least a locking device (5) of a rim (C) of a wheel (R) for vehicles, associated with said bearing structure (2) and rotatable around a first rotation axis (X1);
   at least a tool carrier arm (10) associated mobile with said bearing structure (2) and having at least a tool (11) for removing/fitting a tyre (P) from/on said rim (C);
   at least an auxiliary arm (12) associated mobile with said bearing structure (2) and having at least a bead-pressing tool (13) suitable for facilitating the removal/fitting operations of the tyre (P) from/on the rim (C),
   wherein said auxiliary arm (12) is associated rotatable with said bearing structure (2) around a second rotation axis (X2) substantially parallel to said first rotation axis (X1), in correspondence to at least a hinging point (14) arranged below with respect to a resting surface of said rim (C) defined by said locking device(5), and
   wherein said tool carrier arm (10) can be moved to remove/fit wheel tyres with a radius between a predefined maximum radius (R) and a predefined minimum radius ($R_{min}$), wherein said distance of the second rotation axis (X2) from said first rotation axis (X1) is defined by the following formula:

$$0 \leq d(X1, X2) \leq R_{min}$$

where d(X1, X2) indicates said distance of the second rotation axis (X2) from the first rotation axis (X1) and $R_{min}$ indicates said predefined minimum radius ($R_{MIN}$).

7. Machine Machine (1) for fitting and removing wheel tyres for vehicles, comprising:
   at least a bearing structure (2);
   at least a locking device (5) of a rim (C) of a wheel (R) for vehicles, associated with said bearing structure (2) and rotatable around a first rotation axis (X1);
   at least a tool carrier arm (10) associated mobile with said bearing structure (2) and having at least a tool (11) for removing/fitting a tyre (P) from/on said rim (C);
   at least an auxiliary arm (12) associated mobile with said bearing structure (2) and having at least a bead-pressing tool (13) suitable for facilitating the removal/fitting operations of the tyre (P) from/on the rim (C),
   wherein said auxiliary arm (12) is associated rotatable with said bearing structure (2) around a second rotation axis (X2) substantially parallel to said first rotation axis (X1), in correspondence to at least a hinging point (14) arranged below with respect to a resting surface of said rim (C) defined by said locking device(5), and
   wherein said auxiliary arm (12) comprises at least a substantially vertical portion (16).

8. Machine (1) according to claim 7, wherein said substantially vertical portion (16) has a lower section connected to said hinging point (14), below said resting surface, and an upper section connected to said bead-pressing tool (13), above said resting surface.

9. Machine (1) according to claim 8, wherein said auxiliary arm (12) comprises at least a substantially horizontal portion (15) associated rotatable with said bearing structure (2) in correspondence to said hinging point (14) and connected to said lower section of the substantially vertical portion (16).

10. Machine (1) according to claim 7, wherein said auxiliary arm (12) comprises at least a substantially horizontal portion (15) associated rotatable with said bearing structure (2) in correspondence to said hinging point (14) and connected to said lower section of the substantially vertical portion (16).

11. Machine (1) according to claim 7, wherein said auxiliary arm (12) comprises at least an articulated portion (17) with said bead-pressing tool (13) and hinged to said upper section of the substantially vertical portion (16).

* * * * *